(12) United States Patent
Lykkja et al.

(10) Patent No.: US 9,666,001 B2
(45) Date of Patent: May 30, 2017

(54) VIRTUAL GANTRY DETECTION IN A GNSS SYSTEM

(71) Applicant: Q-Free ASA, Ranheim (NO)

(72) Inventors: Ola Martin Lykkja, Rasta (NO); Hans Christian Bolstad, Trondheim (NO); Anders Løland, Oslo (NO); Ragnar Bang Huseby, Oslo (NO)

(73) Assignee: Q-Free ASA, Ranheim (NO)

( * ) Notice: Subject to any disclaimer, the term of this patent is extended or adjusted under 35 U.S.C. 154(b) by 49 days.

(21) Appl. No.: 14/559,981

(22) Filed: Dec. 4, 2014

(65) Prior Publication Data
US 2015/0179009 A1  Jun. 25, 2015

(30) Foreign Application Priority Data

Dec. 20, 2013 (NO) .................................... 20131721

(51) Int. Cl.
| | |
|---|---|
| G07C 9/00 | (2006.01) |
| G01C 21/30 | (2006.01) |
| G07B 15/06 | (2011.01) |
| G08G 1/017 | (2006.01) |
| G01S 19/14 | (2010.01) |
| G01S 19/42 | (2010.01) |
| G01S 5/00 | (2006.01) |

(52) U.S. Cl.
CPC ......... *G07C 9/00126* (2013.01); *G01C 21/30* (2013.01); *G01S 19/14* (2013.01); *G07B 15/063* (2013.01); *G08G 1/017* (2013.01); *G01S 5/0027* (2013.01); *G01S 19/42* (2013.01)

(58) Field of Classification Search
CPC ....... G01C 21/30; G01S 5/0027; G01S 19/14; G01S 19/42; G07B 15/063; G07C 9/00126; G08G 1/017

USPC .......................................................... 340/928
See application file for complete search history.

(56) References Cited

U.S. PATENT DOCUMENTS

| | | | | |
|---|---|---|---|---|
| 5,717,389 A | * | 2/1998 | Mertens | ............... G07B 15/063 235/384 |
| 7,324,017 B2 | | 1/2008 | Hartinger | |

(Continued)

FOREIGN PATENT DOCUMENTS

| | | |
|---|---|---|
| EP | 1811480 A1 | 7/2007 |
| EP | 1696208 B1 | 5/2008 |
| WO | 2011158038 A1 | 12/2011 |

*Primary Examiner* — Quan-Zhen Wang
*Assistant Examiner* — Stephen Burgdorf
(74) *Attorney, Agent, or Firm* — Alix, Yale & Ristas, LLP

(57) ABSTRACT

Method and system for detecting passages by vehicle at a virtual gantry controlled by a GNSS system comprising an OBU in every vehicle to be surveyed by the system, said OBU receiving signals from satellites to consistently and frequently estimate positions for the vehicle, the method comprising the steps of: defining a virtual gantry in terms of a number of ordered passage lines across a road; determining intersection points from the intersection between the GNSS trace and the passage line; calculating a value representing probability of a true passage at that passage line; for each vehicle for which intersection points have been determined for at least two different passage lines, calculating a total probability value based on the individually calculated probability values; concluding of a true passage by the vehicle in question only if the total probability value is exceeding a predefined minimum value.

13 Claims, 3 Drawing Sheets

(56) References Cited

U.S. PATENT DOCUMENTS

| | | | |
|---|---|---|---|
| 2009/0157566 A1* | 6/2009 | Grush | G01C 21/28 |
| | | | 705/400 |
| 2009/0234580 A1* | 9/2009 | Fernandez-Hernandez | G01C 21/30 |
| | | | 701/436 |
| 2012/0265430 A1 | 10/2012 | Weimann | |
| 2015/0325059 A1* | 11/2015 | Mart Nez Alvaro | G07B 15/06 |
| | | | 705/13 |
| 2016/0055466 A1* | 2/2016 | Du | G06Q 20/145 |
| | | | 705/13 |

* cited by examiner

VIRTUAL GANTRY DETECTION IN A GNSS SYSTEM

BACKGROUND

The disclosure concerns a method for detecting passages by vehicles at a virtual gantry in a road user charging system and a system for conducting said method.

Systems and methods for automatic controlling passages of objects, typically vehicles, into and/or out from certain geographic areas have been developed during the recent decades, and systems and methods based on Global Navigation Satellite Systems (GNSS) technology are prevailing.

Satellite based road tolling systems are rapidly growing in number due to their versatility and flexibility. It allows for an advanced time/distance/place concept where policy makers can adjust price and tolling zones to best fit their objectives. Non-repudiation of the tolling statement is a very important aspect of the toll system. This includes both proving that the toll statement is genuine and proving that the system correctly identifies vehicles passing virtual gantries.

Even if the average performance and availability of GNSS systems today are very good, there will still be situations where the tolling system may be mislead by erroneous position estimates from the GNSS system. In particular in geographical areas where parts of the sky are obstructed by natural or man-made objects, this may be of great concern.

GNSS based tolling is described by international standards. Of most relevance to the herein disclosure is ISO 17573 Electronic Fee Collection—Systems architecture for vehicle-related tolling and ISO 12855 Electronic Fee Collection—Information exchange between service provision and toll charging. The European Union is working towards a common European interoperable system for tolling where road users have On Board Unit (OBU) and a contract with one home toll operator enabling pan-European roaming where foreign toll charges are invoiced through the home toll operator. This is known as the EETS directive, Directive (2004/52/EC) of the European Parliament and of the Council of 29 Apr. 2004 on the interoperability of electronic road toll systems in the Community. Furthermore, the European Commission Decision (2009/750/EC) of 6 Oct. 2009 on the definition of the European Electronic Toll Service and its technical elements, puts this into effect.

A satellite based road tolling system comprises three main physical elements: 1) The satellites 2) vehicles equipped with OBUs observing signals from the satellites and 3) a so-called back office.

A virtual gantry is a road charging point equivalent to a traditional road charging toll gantry, but normally defined virtually on a map for GNSS road tolling purposes.

The most typical use of such systems is for tolling, where each vehicle owner pays a certain fee for use of the road at passage of a virtual gantry. In general there are two kinds of errors encountered with the use of such systems, one being a false registration of a passage, the other being missed recognition of a passage that actually occurred. Additionally, the detection may erroneously be attributed to a wrong location or a wrong time. All errors may result in lower user confidence in the system and increased operational costs.

WO 2011158038 A1 teaches a method for detecting whether a path has been followed by an object, comprising the steps of receiving position data for the object at timed intervals, determining whether the object has followed the path by detecting a crossing, by the object, of at least one virtual gantry, the virtual gantry defined by a line segment in space crossing the path. Further optional validation checks for each gantry crossing are described, including the detection of the crossing of a number of virtual gantries, in an expected sequence, and over expected distances in an expected direction. A system for carrying out the method is also disclosed.

EP publication 1 696 208 (A1) describes a method and a system by which coordinates are acquired, e.g. by a GPS receiver, and compared with stored data including a definition of an area, or 'virtual gantry', which is defined by a polygon progression. The area lies in a position coordinate system, and the coordinates of the area match the coordinates of a geographic region. The area is provided with an attribute in the form of an orientation. At least one parameter derived from the position coordinates of the vehicle is compared with the orientation of the area. An independent claim is included for a system for detecting vehicles in a geographic region.

U.S. Pat. No. 7,324,017B2 describes a process for determining travel through at least one toll road section by at least one vehicle by means of a position determination system which is set up to determine the current position of the at least one vehicle, whereby positions of the at least one vehicle are compared with the position of at least one reference point characteristic for an entrance to a toll road section, whereby the orientation of the vehicle is determined within a specifiable region about the entrance, whereby it is determined whether the orientation determined agrees within a specifiable tolerance range with the orientation characteristic of entry onto the toll road section.

US 2012265430 A1 teaches a method for detecting a boundary crossing of an object, the movement of which being represented by a sequence of positions on a digital road map with vectorized road segments and at least one boundary. The method comprises determining an intersection of the boundary with a road segment and a reference direction in the orientation of this road segment, successively projecting vectors, each determined between one of the positions and the intersection point, onto the reference direction, in order to obtain a sequence of projections, and detecting a boundary crossing if a change of direction or sign occurs in the sequence of projections. EP 1811480 A1 concerns an automatic charging system for charging a vehicle for using infrastructure delimited by a boundary during a charging period, based on GNSS location. The system comprises i) an onboard receiver (OBU) which, in addition to providing position information, provides additional information relating to the error that can be expected in said position consisting of a health flag and an RPL (Radial Protection Level), i.e. the amount limiting the horizontal position error according to one direction and with a probability equal to a known value, ii) a detection module determining that the vehicle is within the boundary at a moment when all the delimited point of a region comprised by a circle of radius RPL centred on said position are within the boundary, and iii) a charging module using the result of the detection module to determine that the vehicle has used the infrastructure during the charging period in question. EP 1811480 also concerns a method of analysis and design of such charging system.

In spite of the efforts to provide and improve systems like those described above, there is still a need, in particular in relation to vehicle surveillance, for methods and systems related to surveillance and position detection of vehicles in a GNSS system, ensuring higher reliability, resulting in lower rates of missed recognition and lower rates of erroneous detections than do existing systems and methods.

SUMMARY

Disclosed herein is a method and a system for GNSS based detection of vehicles passing a virtual gantry, which provides improved reliability and reduces the number of erroneous registrations compared to existing methods and systems.

The versatility of the disclosed method is its inherent strength. The fact that road widths and tolerances can be defined individually for each virtual gantry and even for each defined passage line at a certain virtual gantry, dependent on local individual characteristics, allows a unique degree of certainty that the vehicle in question really did pass the actual virtual gantry and not e.g. a road nearby, crossing under or over, or just stopped in a parking lot nearby. The decision of passage of the virtual gantry is based on many GNSS observations allowing the method to use observations with greater independence mitigating the short term correlation in the measurements derived from satellite signals.

The method and system use multiple observations received over some time period and the concrete geospatial design of the particular virtual gantry, to construct a probability score, Total Probability Value (TPV), for the passage of the virtual gantry.

It is to be noted that the mathematical calculations for systems like the present one, the calculation of each event may typically be performed using complementary probabilities, i.e. of the occurrence of a non-event or of a non-passage of a vehicle. It should also be noted that the present invention does not depend upon whether the mathematical method is defined to calculate the actual occurrence (passage) or the complementary occurrence (non-passage).

In the discussion below the following terms and abbreviations are used.

| Term | Symbol | Explanation |
|---|---|---|
| Center point | c | Center point of passage line. |
| Contributory probability value | cpv | A value contributing to the TPV calculated for each observed intersection point. Calculations may typically be performed on the complementary probability (npv). |
| Detection area | A | The polygon that is enclosing all passage lines. |
| Distance | $d_i$ | Distance from centre point c to intersection point i represented by a signed value, positive to one side (e.g. the right side) of the centre point, and negative to the other side (e.g. the left side). |
| Intersection point | $i_i$ | Point where the vehicle trajectory between points $P_n$ and $P_{n+1}$ intersects the predefined Passage Line $PL_i$. |
| GNSS | | Global Navigation Satellite System. |
| Mean Absolute Error | MAE | Mean absolute error—a statistical method used to calculate an average error. |
| Non-passage contributory probability value | npv | Complementary contributory probability value, i.e. npv = 1 − cpv. It is calculated for each observed intersection point. |
| Non-passage Probability Value | NPV | Value representing the probability of a non-passage of a virtual gantry, i.e. NPV = 1 − TPV, possibly calculated by an aggregation of npv. |
| Number of passage lines | | LCNumber of passage lines crossed within a virtual gantry. |
| OBU | | On board unit—the device used in the vehicle for position registration. |
| Passage Line | PL | A line crossing the driving path. An ordered set of passage lines defined the virtual gantry. |
| Position | P | A location identified in a geographic coordinate system, either accurate surveyed coordinates or estimates made by a GNSS system. |
| Root Mean Square Error | | RMSE Root mean square error—a statistical method used to calculate an average error. |
| Tolerance | t | The tolerance of the road width, always larger than the road width w. Separate tolerances can be set for left and right side. Tolerance is defined from the centre point of the road. |
| Total Probability Value | TPV | Value representing the probability of the occurrence of a virtual gantry passage, calculated by aggregating a number of contributory probability values (cpv). |
| Virtual Gantry | VG | The virtual variant of a traditional road toll plaza with physical gantries and/or manual payment stations. |
| Width | w | The (local) road width. |

A virtual gantry may be defined as an ordered sequence of passage lines. Each passage line ($PL_i$) is defined with a centre point ($c_i$). To each centre point right and left partial road widths ($w_{ri}$ and $w_{li}$) are associated. These partial road widths may be mutually identical (symmetrical) or different (asymmetrical). Further, a right and left tolerance ($t_{ri}$ and $t_{li}$) may be added to the definition extending outside the road width. Both width and tolerance are given as distances from the centre point. The nominal driving direction is implicitly known from the sequential ordering of the passage lines. Though constituting a preferred embodiment it is not a requirement for the method according to the present invention that any one of the passing lines actually corresponds to the actual geographical gantry point. It is not a requirement that the centre points coincide with the physical centre line of the road or any driving lane.

The virtual gantry definition parameters should be adapted to local geometry and topology taking into account nominal driving speeds, typical GNSS reception quality, local road topology, and other factors that may interact with the performance of the detection method. Larger driving speeds will typically require a larger detection area. For roads with tight curves a higher number of passage lines may be required such that the curve defined by the centre points efficiently follows the road with relevant accuracy.

For road networks with complex geometries, the method is contemplated to encompass passage lines at different vertical levels. This may be needed to distinguish between virtual gantries covering roads in multiple levels where latitude and longitude description is not alone enough to differentiate between the virtual gantries. This may pertain to elevated highways with local road network underneath, roads under bridges, and road systems in tunnels, etc. In this embodiment, the passage lines must be augmented with vertical tolerance information, i.e. a passage rectangle.

DETAILED DESCRIPTION

Figure 1:
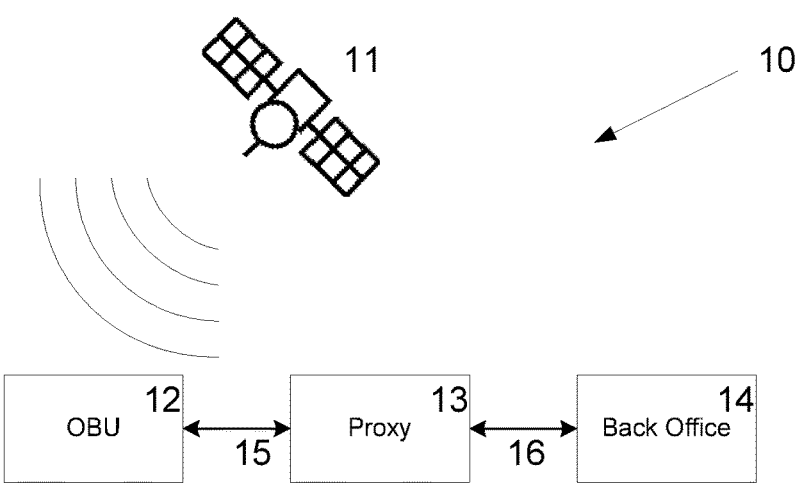
FIG. 1 is a schematic illustration of a system architecture of a GNSS based system for vehicle localization monitoring, which is compliant with ISO 17573.

The elements encountered in a GNSS system 10 illustrated in FIG. 1 are a satellite 11, an OBU 12, a proxy 13 and a back office 14. There is a first exchange of data communication 15 between the OBU and the proxy, and a second exchange of data communication 16 between the proxy 13 and a back office 14. There is no limitation with regard to the technology involved with the exchange of information between the different units. There is not necessarily a one-to-one relation between the shown elements; there will e.g. typically be a number of satellites 11 monitored by the OBU to estimates its location. The satellites 11 are able to furnish an OBU 12 in a vehicle with information enabling OBUs to estimate their position (at the surface of the earth) at any given point in time.

All calculations made and/or conclusions drawn with regard to assessment of passages may be performed either locally, like in the individual OBUs, centrally in a back office or by a proxy or in any other combination found convenient therefore.

Figure 2:
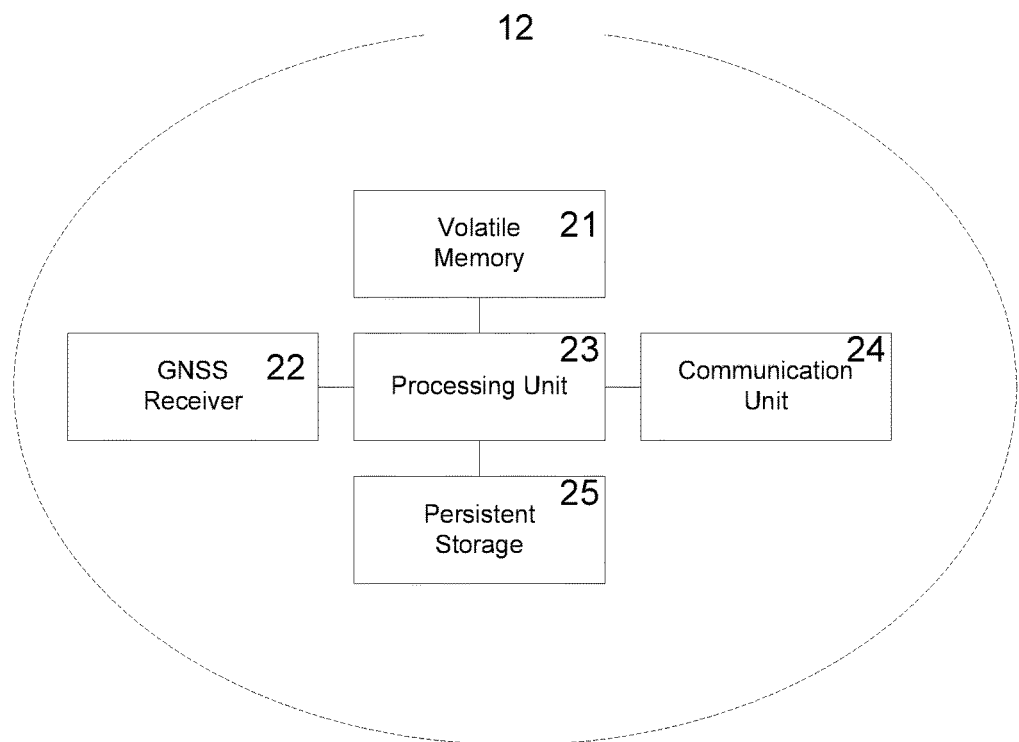
FIG. 2 is a schematic illustration of the internal structure of an OBU unit.

FIG. 2 illustrates the logic components of the OBU 12. The OBU includes a volatile memory 21, a GNSS receiver 22, a processing unit 23, a communication unit 24 and persistent storage 25. The OBU may be a physical device dedicated to the GNSS tolling system, but it may also be present as a function integrated in other devices fit for the purpose, such as a tachograph or other device, portable, mounted in, or integrated in the vehicle.

These components are standard components of an OBU unit for GNSS road user charging, and their function is therefore not explained in more detail here.

It should be emphasized, though, that while the inventive concept makes use of such a system, the GNSS 10 and the OBU 12 are generally known. The GNSS receiver module 22 may be implemented with different levels of sophistication, ranging from a simple GPS receiver to a complex navigation unit using information from multiple GNSS systems, motion sensors with vehicle instruments and sensors.

Figure 3:
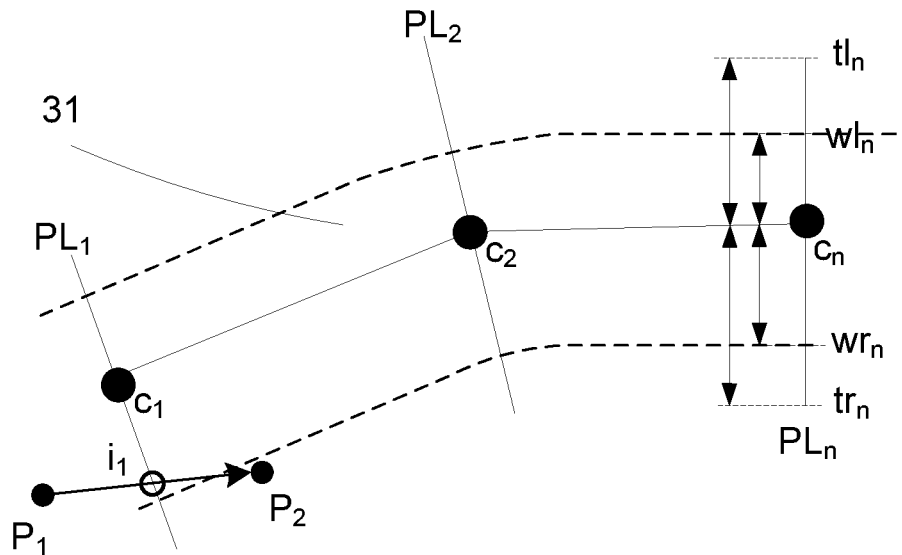
FIG. 3 shows an embodiment of a virtual gantry according to the disclosure, with n passage lines and two position estimates.

FIG. 3 shows a virtual gantry in relation to a road or street 31. As a tool for determining passage of a vehicle, by the virtual gantry, a number of centre points c are defined, subscripted as $c_1, c_2, \ldots, c_{n-1}, c_n$ along the road or street in question. Through each centre point a virtual passage line PL is defined, subscripted in the same manner. The passage lines are typically perpendicular on the road direction, but minor deviations may occur, especially if the centre point is at a point where the road has a bend. The centre point to the far right of the FIG. 3 has the subscript n to indicate that more than the three shown centre points may be encountered in the virtual gantry.

At the right-most centre point $c_n$, the road width is indicated as composed of a left-hand road-width $wl_n$ and a right-hand road-width $wr_n$. The left-hand road width need not be of the same magnitude as the right-hand road width. Also shown at $c_n$ is a parameter denoted tolerance, or more particularly left-hand tolerance $tl_n$ and right-hand tolerance $tr_n$. The left-hand tolerance extends beyond the left-hand road-width and the right-hand tolerance extends beyond the right-hand road-width. The significance of the tolerance is to allow a more versatile mathematic model for the assessment of crossings passed the virtual gantry compared to a model calculating based on just road-width (see FIG. 5). Although for simplicity shown only at the right-most centre-point, road widths and tolerances are defined in the same general manner, though individually, for each and every centre point encountered.

FIG. 3 also illustrates two in time subsequent position detections made by the GNSS, namely a first position $P_1$ and a second position $P_2$. These two positions are localized at different sides of passage line $PL_1$, and the system is so configured as to calculate an intersection point $I_1$ as the point where a straight line between the two detected positions $P_1$ and $P_2$ crosses the passage line $PL_1$. As further described below, the distance $d_1$ from the centre point $c_1$ to the intersection point $I_1$ is a valuable parameter in the further process of determining whether or not the two mentioned position detections are an indication of a vehicle passing the virtual gantry.

In FIG. 3 the direction of movement for the vehicle in question appears to be from left to right. Intersection point $i_1$ is within the right-hand road width $wr_n$, and the occurrence of the two identified positions $P_1$ and $P_2$ gives a positive contribution to the mathematical model determining whether or not a passage across the virtual gantry is about to take place. One observation of an intersection point at one sole passage line is, however, typically not sufficient to positively conclude that a passage has occurred.

Figure 4:
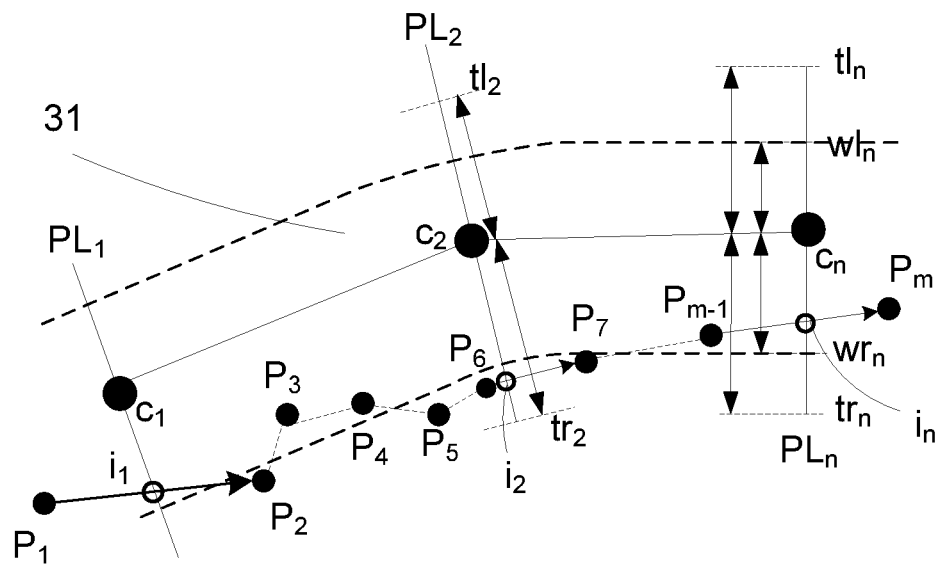
FIG. 4 shows the virtual gantry according to FIG. 3 at a later point in time.

FIG. 4 shows the same virtual gantry as FIG. 3, but a few moments later in time. Here we can see that a number of additional positions $P_3, P_4, P_5, P_6, P_7, \ldots, P_m$ have been detected. Among these, $P_6$ and $P_7$ are localized at different sides of passage line $PL_2$, thus defining a second intersection point $i_2$. As shown by FIG. 4 intersection point $i_2$ is localized outside the local road width. The detection is not for this reason automatically disregarded and cancelled. When the intersection point is not within the local road width, the system or method checks whether or not the intersection point is within the local tolerance $tr_2$. In this case it is localized within the local tolerance $tr_2$. Another, final intersection point $i_n$ is shown at passage line $PL_n$.

The mathematical model used to determine passage or not passage according to the present invention thus assigns a positive contributory probability value (cpv) to this intersection point (i), though a lesser value than would have been the case had the intersection point been within the road width. In practice the mathematical model more typically makes use of the complementary probability (npv), which does have its minimum value in proximity to the centre point.

Figure 5A:
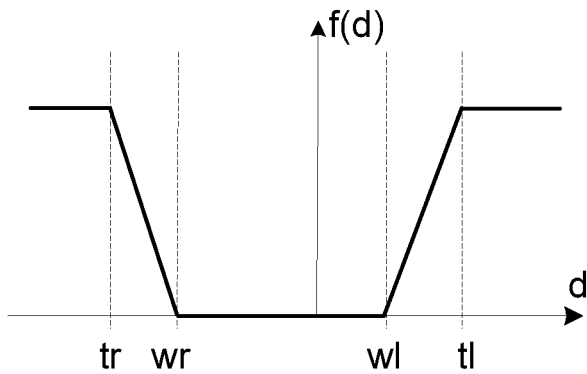
FIGS. 5a and 5b show examples of a function indicating the relation between signed distance from centre point and contributory probability value (cpv).
Figure 5B:
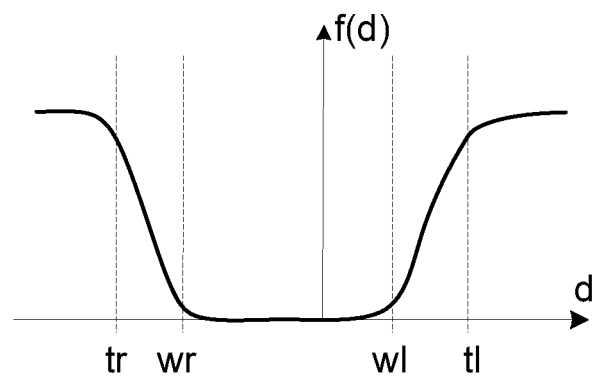

Each contributory probability value is taken into account by the mathematical model as explained in further detail below. Two examples of mapping functions from distance to probability are shown in FIGS. 5a and 5b. Many other mapping functions are possible. Note that distance is here represented by a signed value, positive to the right of centre point, and negative to the left enabling asymmetrical functions.

As a person skilled in the art will know, a number of factors influence the accuracy of GNSS position assessments, such as small deviations in the orbit of satellites, reflection of signal from near-by infrastructure, buildings or mountains, clock errors, troposphere and ionosphere properties, etc. Therefore it makes sense not to automatically cancel every measurement that is slightly out of position. Some of these error factors are of a seemingly random type and may cause, within certain limits, an unpredictable zig-zag pattern for the detected positions. Other factors are more correlated in time, at least within a certain period of time. Other error factors may be more dependent on local topographical elements, such as errors caused by reflection of signals from nearby structures like large buildings or terrain.

In statistical calculations it may be more practical to use the complementary occurrence of the event of interest. In the present case, the complementary occurrence is the occurrence of non-passage in relation to detections of a vehicle close to a virtual gantry, the probability of a non-passage (Non-passage Probability Value, NPV) being mathematically defined as: NPV=1−TPV. A reason for calculating probabilities of non-passage rather than passage being that the primary factor to consider, namely the distance of detected intersection points from the centre point of a given passage line, increases with decreasing probability of a passage. The use of complementary events allows for other scaling factors for the mapping functions and thus increased penalty for passage line crossings further out from the centre point.

For the disclosed mathematical model to conclude that a crossing of a vehicle passing the virtual gantry has occurred, a calculated Total Probability Value (TPV) must be above a certain minimum value. TPV is calculated by aggregating contributory probability values assigned to each intersection points found within the tolerance limits for each and every passage line where intersection points have been detected for the one and same OBU within a certain limited period of time. The versatility of the present system allows the contributory probability values to assume other values than 0 or 1, and as such allows the minimum threshold value for the TPV to also be defined at any value between 0 and 1.

A specific embodiment of the disclosed mathematical model makes use of root mean square error (RMSE) as a statistical aggregation function. Functions such as mean absolute error (MAE) may also be used. Other possibilities include counting passages with contributory probability values above a certain limit, and if the count reaches a predefined limit, a virtual gantry pass is assessed. As a refinement, some passage lines may be defined as compulsory to pass.

In the following, the principles of the present invention are explained in a step by step exemplary embodiment:

1. The OBU equipment collects information from available GNSS satellites and computes position estimates $P_k$.

2. The positions of the virtual gantries are entered into the analyzing system as Passage Lines ($PL_j$) with centre coordinates, width of road with tolerance data, number of virtual passage lines.

3. For each position estimate pair ($P_k$, $P_{k-1}$) detected at different sides of a passage line $PL_j$, the intersection between $PL_j$ and the straight line between $P_k$ and $P_{k-1}$ is calculated and given an index (e.g. intersection $i_j$).

4. The mathematical model assigns a positive contributory probability value (cpv) to the intersection point by calculating the signed distance $d_i$ from centre point ($c_i$) to intersection point ($i_i$) and applying the function $f$ (see FIGS. 5a and 5b) on $d_i$. A larger value indicates higher probability of a true passage on the road.

5.1a If a passage line detection has been assessed, then increment the number of passage lines crossed LC.

5.1b Compare the accumulated number of passages detected to a predefined threshold $LC_{min}$ for this virtual gantry.

5.1c If $LC > LC_{min}$, the virtual gantry is considered passed. This can be expressed as an aggregation of contributory probability values by applying the formula below:

$$TPV_{count} = \frac{1}{n}\sum_{i=1}^{n} I(f(d_i) > p_{lim})$$

where I(true)=1 and I(false)=0

The function $f$ can be defined as a non-linear function of distance, road width and tolerances. Example: The function $f$ can be set to 0 within the road width w, and 1 elsewhere to disregard positions detected outside w. FIGS. 5a and 5b shows other examples.

5.1d If $TPV_{count}$ is above a predefined lower limit the VG is considered to have been passed.

5.2a Refinement i) Some passage lines may be defined as compulsory to pass. If e.g. line $PL_2$ is compulsory and lines that were detected true were $PL_1$, $PL_3$ and $PL_4$, the virtual gantry would be considered not passed.

5.3a Refinement ii) The intersection point found in step 3 is used to calculate the distance $d_i$ to the centre point $c_i$.

5.3b When exiting the detection area, calculate the TPV using Root Mean Square Error (RMSE) as:

$$TPV_{RMSE} = \sqrt{\frac{1}{n}\sum_{i=1}^{n} f(d_i)^2}$$

5.3c If $TPV_{RMSE}$ is above a predefined lower limit the VG is considered to have been passed.

5.4a Refinement iii) The intersection point found in step 3 is used to calculate the distance $d_i$ to the centre point $c_i$.

5.4b When exiting the detection area, calculate TPV using the Mean Absolute Error (MAE) as:

$$TPV_{MAE} = \frac{1}{n}\sum_{i=1}^{n} |f(d_i)|$$

5.4c If $TPV_{MAE}$ is above a predefined lower limit the VG is considered to have been passed.

5.5a Refinement iv) The intersection angle between passage line and vehicle trajectory line (vehicle heading) must have a value between predefined limits to qualify for the passage line crossing in step 4. The intersection angle can then be regarded as an additional input parameter to the function $f$ in step 5.3b.

In addition to the aggregation methods listed above (RMSE, MAE and counting), other methods may be selected.

Winsorization is a method where outliers are removed before using RMSE or MAE. The set of $f(d_i)$ are sorted and an equal number of outliers on the low end and in the high end are removed. This will reduce the emphasis on outliers.

The median or average of the population of $f(d_i)$ may be used.

A variation of MAE where the individual absolute values of $f(d_i)$ are raised to a (non integer) power (r) before the sum is calculated and then the aggregated value is calculated by taking the $r^{th}$ root of the sum. This will affect the emphasis on outliers, increasing for r larger than 1 and reducing for r between 0 and 1.

A person skilled in the art would understand that other mathematical methods may be applied.

With regard to preferred embodiments the following should be noted:

The centre points (c) may be individually positioned at each virtual gantry and determined based on at least one factor chosen among local topography, number of driving lanes in each direction, local road width (w), and occurrence of factors assumed to influence the local accuracy of the GNSS system (10).

The road width (w) at a passage line (PL) is typically calculated as the sum of the longitudinal extension ($w_{left}$) of the passage line (PL) to a first or left lateral side of the centre point (c) and the longitudinal extension ($w_{right}$) of the passage line (PL) to the other or right lateral side of the centre point (c).

The local tolerance (t) defined for the passage lines (PL) constituting a virtual gantry, is typically a fixed linear distance.

Separate tolerances ($t_i$, $t_{ii}$, etc.) may be defined for each individual passage line (PL), the tolerances being defined based upon occurrence of local factors assumed to influence the accuracy of the GNSS system (10). Furthermore, separate tolerances (t) may be defined for each individual longitudinal extension ($t_{left}$ and $t_{right}$) at each passage line (PL), the tolerances being defined based upon occurrence of local factors assumed to influence the accuracy of the GNSS system (10). The tolerances (t) defined for the passage lines (PL) constituting the virtual gantry may furthermore be individually defined based upon the presence of nearby or crossing roads.

The calculated numerical value representing a contributory probability value (cpv), typically has a fixed maximum for a position detected within the local road width (w) and a reduced value for positions detected outside the local road width (w), but within the local tolerance (t) reaching a value of zero at the outer end of the local tolerance (t). The reduced contributory probability value (cpv) may typically increase proportionally from a minimum at the outer end of the local tolerance (t) to a maximum at the road edge.

Typically, a total number of n passage lines (PL) are mathematically defined to constitute the virtual gantry and that a real numerical value is determined as representing the local contributory probability value (cpv) at each passage line (PL), the total probability value (TPV) being a value mathematically obtainable from said local contributory probability values (cpv).

Also typically, for practical reasons the calculation of probability of passage is conducted in a manner calculating the complementary value of the probability of passage, namely a probability NPV of non-passage of the virtual gantry, being defined as NPV=1−TPV.

The total probability value (TPV) is a value typically obtained from the equation:

$$TPV_{RMSE} = \sqrt{\frac{1}{n}\sum_{i=1}^{n} f(d_i)^2}$$

Wherein n is the number of passage lines (PL) at the virtual gantry, $d_i$ is the signed distance between the position estimate and the centre line at observation i, $f$ is a mathematical function where parameters may be derived from road widths ($w_1, \ldots, w_n$) and tolerances ($t_1, \ldots, t_n$).

The invention claimed is:

1. A method for detecting passages by vehicles at a virtual gantry controlled by a global navigation satellite system (GNSS) (10) comprising an on-board unit (OBU) (12) in every vehicle to be surveyed by the system, said OBU receiving signals from satellites (11) to consistently and frequently estimate positions for the vehicles, comprising the steps of:

(i) defining a virtual gantry in terms of a number of ordered passage lines (PL) across a road, each passage line being further defined by a centre point (c), a local road width (w) and at least one local tolerance (t) defined as a linear extension beyond the local road width (w), (ii) determining an intersection point (I) for each vehicle for which two in succession estimated positions ($P_{k-1}$, $P_k$) are localized at different sides of a passage line (PL), as the point where a straight line between the two positions intersects the passage line (PL) in question, (iii) calculating a numerical value representing probability (cpv) of passage at the passage line, as a function $f$ of the determined intersection point (I) in relation to the local road width (w) and local tolerance (t), (iv) calculating a total probability value (TPV) for each vehicle for which intersection points (I) according to step (ii) have been determined for at least two different passage lines ($PL_i$, $PL_{ii}$, ...) within a defined period of time, in the order defined by step (i), based on the individually calculated, contributory probability values (cpv) calculated in step (iii) at each of the at least two passage lines ($PL_i$, $PL_{ii}$), (v) determining that the vehicle has truly passed the virtual gantry if the TPV exceeds a predefined minimum value, wherein the total probability value (TPV) is a value obtained from the equation:

$$TPV_{RMSE} = \sqrt{\frac{1}{n}\sum_{i=1}^{n} f(d_i)^2}$$

wherein n is the number of passage lines (PL) at the virtual gantry, $d_i$ is the signed distance between the position estimate and a centre point at observation i, and $f$ is a mathematical function for which parameters are derived from road widths ($w_1, \ldots, w_n$) and tolerances ($t_1, \ldots, t_n$).

2. The method of claim 1, wherein one passage line (PL) corresponds to the actual geographic position of the virtual gantry.

3. The method of claim 1, wherein the centre points (c) are individually positioned at each virtual gantry and are determined based on at least one factor chosen from the group consisting of local topography, number of driving lanes in each direction, local road width (w), and occurrence of factors assumed to influence the local accuracy of the GNSS system (10).

4. The method of claim 1, wherein the local road width (w) at a passage line (PL) is calculated as the sum of the longitudinal extension ($w_{left}$) of the passage line (PL) to a first or left lateral side of the centre point (c) and the longitudinal extension ($w_{right}$) of the passage line (PL) to the other or right lateral side of the centre point (c).

5. The method of claim 4, wherein separate local tolerances (t) are defined for each individual longitudinal extension ($t_{left}$ and $t_{right}$) at each passage line (PL) based upon occurrence of local factors assumed to influence the accuracy of the GNSS system (10).

6. The method of claim 1, wherein the local tolerance (t) defined for the passage lines (PL) constituting a virtual gantry, is a fixed linear distance.

7. The method of claim 1, wherein separate local tolerances ($t_i$, $t_{ii}$, etc.) are defined for each individual passage line (PL) based upon occurrence of local factors assumed to influence the accuracy of the GNSS system (10).

8. The method of claim 1, wherein the local tolerances (t) defined for the passage lines (PL) constituting the virtual gantry are individually defined based upon the presence of nearby or crossing roads.

9. The method of claim 1, wherein the calculated numerical value representing a contributory probability value (cpv), has a fixed maximum for a position detected within the local road width (w) and has a decreased value for positions detected outside the local road width (w), but within the local tolerance (t) reaching a value of zero at the outer end of the local tolerance (t).

10. The method of claim 9, wherein the reduced contributory probability value (cpv) is a value increasing proportionally from a minimum at the outer end of the local tolerance (t) to a maximum at the road edge.

11. The method of claim 1, wherein the calculation of probability of passage is conducted in a manner calculating a complementary value of the probability of passage, namely a probability NPV of non-passage being defined as NPV=1−TPV.

12. The method of claim 1 wherein some or all passage lines (PL) may be defined as compulsory to pass.

13. A system for detecting passages by a vehicle at a virtual gantry controlled by a global navigation satellite system (GNSS) system (10) comprising an on-board unit (OBU) (12) in every vehicle to be surveyed by the system, said OBU receiving signals from satellites (11) to consistently and frequently estimate positions for the vehicle, the system further comprising:
  software programmed to
    (i) define a virtual gantry in terms of a number of ordered passage lines (PL) across a road, a local road width (w) and at least one local tolerance (t) defined as a linear extension beyond the local road width (w), and
    (ii) determine an intersection point (I) as the point where a straight line between the two positions ($P_i$, $P_{ii}$) intersects the passage line (PL) in question for each vehicle for which two in succession estimated positions ($P_i$, $P_{ii}$) are localized at different sides of a passage line (PL),
    (iii) calculate a numerical value representing the probability (cpv) of true passage at the passage line (PL), as a function of the determined intersection point (I) in relation to local road width (w) and local tolerance (t),
    (iv) calculate a total probability value (TPV) based on the individually calculated, contributory probability values (cpv) calculated at each of the at least two passage lines ($PL_i$, $PL_{ii}$) for each vehicle for which intersection points (I) have been determined for at least two different passage lines ($PL_i$, $PL_{ii}$, . . . ) within a defined period of time, in the order mentioned above, and
    (v) determining that the vehicle has truly passed the virtual gantry if the total probability value (TPV) exceeds a predefined minimum value, wherein
  the total probability value (TPV) is a value obtained from the equation:

$$TPV_{RMSE} = \sqrt{\frac{1}{n}\sum_{i=1}^{n} f(d_i)^2}$$

wherein n is the number of passage lines (PL) at the virtual gantry,
$d_i$ is the signed distance between the position estimate and a centre point at observation i, and
$f$ is a mathematical function for which parameters are derived from road widths ($w_1$, . . . , $w_n$) and tolerances ($t_1$, . . . , $t_n$).

* * * * *